(12) United States Patent
Keslin et al.

(10) Patent No.: US 9,141,709 B1
(45) Date of Patent: Sep. 22, 2015

(54) RELEVANT FILE IDENTIFICATION USING AUTOMATED QUERIES TO DISPARATE DATA STORAGE LOCATIONS

(71) Applicant: Microsoft Technology Licensing, LLC, Redmond, WA (US)

(72) Inventors: Jonathan Keslin, Kirkland, WA (US); Mary David, Seattle, WA (US); Carlos Perez, Seattle, WA (US); Reed Pankhurst, Kirkland, WA (US); Joshua Stickler, Seattle, WA (US); Manfred Berry, Oslo (NO); Marius Tennoe, Oslo (NO); Oleg Melnychuk, Oslo (NO); Ricardo Escutia, Redmond, WA (US); Berit Herstad, Oslo (NO); Melissa Torres, Kirkland, WA (US); Skye Lee Pazuchanics, Duvall, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/549,410

(22) Filed: Nov. 20, 2014

(51) Int. Cl.
    *G06F 17/30* (2006.01)
(52) U.S. Cl.
    CPC .... *G06F 17/30867* (2013.01); *G06F 17/30106* (2013.01); *G06F 17/30165* (2013.01)
(58) Field of Classification Search
    CPC ..................... G06F 17/30864; G06F 17/30867
    See application file for complete search history.

(56) References Cited

U.S. PATENT DOCUMENTS

| | | | |
|---|---|---|---|
| 5,826,252 A * | 10/1998 | Wolters et al. | 717/101 |
| 8,032,513 B2 | 10/2011 | Newbold et al. | |
| 8,484,207 B2 | 7/2013 | Oral et al. | |
| 8,612,388 B2 * | 12/2013 | Laxminarayanan | 707/625 |
| 8,949,231 B2 * | 2/2015 | Aravamudan et al. | 707/727 |
| 2008/0243632 A1 * | 10/2008 | Kane et al. | 705/26 |
| 2008/0276171 A1 * | 11/2008 | Sabo | 715/711 |
| 2010/0031162 A1 * | 2/2010 | Wiser et al. | 715/747 |
| 2010/0058417 A1 * | 3/2010 | Rondeau et al. | 725/110 |
| 2010/0241507 A1 * | 9/2010 | Quinn et al. | 705/14.42 |
| 2011/0106736 A1 * | 5/2011 | Aharonson et al. | 706/12 |
| 2012/0047445 A1 | 2/2012 | Rajagopal | |
| 2012/0151331 A1 | 6/2012 | Pallakoff et al. | |
| 2012/0173250 A1 * | 7/2012 | Jeffrey et al. | 705/1.1 |
| 2012/0221571 A1 * | 8/2012 | Orman | 707/737 |
| 2012/0284197 A1 * | 11/2012 | Sitrick et al. | 705/301 |

(Continued)

OTHER PUBLICATIONS

"New Features and Enhancements in M-Files 10.0", Retrieved on: Sep. 15, 2014 Available at: http://www.m-files.com/Content/documents/en/res/M-Files_10.0_New_Features_and_Enhancements.pdf.

*Primary Examiner* — Leslie Wong
(74) *Attorney, Agent, or Firm* — Tom Wong; Jim Ross; Micky Minhas (57) ABSTRACT

Relevant files are determined for a user upon detecting a user action such as save, load, open, view, share, or comparable ones associated with a file. The relevancy may be determined through one or more queries based on, a number of criteria, where the queries are executed on local or remote data stores related to the user. For example, files on the local computing device of the user, files in an enterprise network associated with the user, files on a social network subscribed by the user may be evaluated for various relevancy criteria. Files determined to be relevant may be prioritized, ordered, and/or grouped for suggestion to the user and presented through a user interface of an application performing the detected action.

19 Claims, 8 Drawing Sheets

(56) References Cited

U.S. PATENT DOCUMENTS

| | | |
|---|---|---|
| 2012/0323935 A1 | 12/2012 | Evans et al. |
| 2013/0031208 A1* | 1/2013 | Linton et al. ................. 709/217 |
| 2013/0067338 A1 | 3/2013 | Kern et al. |
| 2013/0326022 A1* | 12/2013 | Ehrlich et al. ................ 709/219 |
| 2014/0025712 A1* | 1/2014 | Chisa et al. ................... 707/827 |
| 2014/0164446 A1 | 6/2014 | Abuelsaad et al. |
| 2014/0208296 A1* | 7/2014 | Dang et al. ................... 717/123 |
| 2014/0236930 A1 | 8/2014 | Matthews et al. |
| 2014/0258198 A1* | 9/2014 | Spivack et al. ................ 706/21 |
| 2014/0280107 A1* | 9/2014 | Heymans et al. ............. 707/727 |
| 2014/0280289 A1* | 9/2014 | Marantz et al. ............... 707/767 |
| 2014/0304247 A1* | 10/2014 | Fastlicht ....................... 707/706 |
| 2014/0337436 A1* | 11/2014 | Hoagland et al. ............ 709/204 |

* cited by examiner

RELEVANT FILE IDENTIFICATION USING AUTOMATED QUERIES TO DISPARATE DATA STORAGE LOCATIONS

BACKGROUND

Users often work with many file, which may be locally saved, or from one or more networks. When working with a variety of applications, users need access to files to open a new file, to send a file to another user, to save a file, to share a file, and other use scenarios. Users may have to find files they need through manual search. Some approaches provide a list of most recently used files or a list of files from a current or last used location. However, in the multi-dimensional file storage, use, and attribute environments of today's computing, these approaches may be limited and one-dimensional.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to relevant file identification using automated queries to disparate data storage locations for actions such as save, open, load, view, share, or similar ones. The automatic suggestion may include detection of an action on a locally stored file or a remotely stored file associated with a user such as viewing of a library or folder, generation of one or more queries to determine files relevant to the user, and submittal the one or more queries to one or more local data stores at the computing device and remote data stores. The one or more files determined to be relevant to the user may then be suggested based on results of the submitted one or more queries.

These and other features and advantages will be apparent from a reading of the following detailed description and a review of the associated drawings. It is to be understood that both the foregoing general description and the following detailed description are explanatory and do not restrict aspects as claimed.

GLOSSARY

Content—any form of structured data and streaming data that is associated with audio, video, graphics, images, and text.

User—a person with whom the content to be saved is associated.

Subscriber—an account holder with access to applications and cloud storage at a collaborative service.

Collaborative Service—a set of coordinated applications and associated cloud storage hosted by a plurality of servers providing access to the functionality of the applications and collaboration opportunities through web browser or locally installed client application user experiences to a plurality of users. The collaborative service may provide its services to "clients" or "tenants", who in turn may allow users or subscribers to access the provided services.

Cloud storage—one or more data stores accessible through networks.

Permission level—a security setting that enables a user to control access to the content within a data storage.

Computing device—a device comprising at least a memory and a processor that includes a desktop computer, a laptop computer, a tablet computer, a smart phone, a vehicle mount computer, or a wearable computer.

Memory—a component of a computing device configured to store one or more instructions to be executed by one or more processors.

A processor—a component of a computing device coupled to a memory and configured to execute programs in conjunction with instructions stored by the memory.

File—any form of structured data that is associated with audio, video, graphics, images, and text.

Third party service—an independent service separate from a system used by the initiating user and the target user, another service, or an application.

Operating system—a system configured to manage hardware and software components of a computing device that provides common services and applications.

Integrated module—a component of an application or service that is integrated within the application or service such that the application or service is configured to execute the component.

Application—a program that when executed enables a user to communicate, create, edit, and share content.

Computer-readable memory device—a computer-readable storage medium implemented via one or more of a volatile computer memory, a non-volatile memory, a hard drive, a flash drive, a floppy disk, or a compact disk, and comparable hardware media that includes instructions thereon to automatically save content to a location.

User experience—a visual display associated with an application or service through which a user interacts with the application or service.

User action—an interaction between a user and a user experience of an application or a user experience provided by a service that includes one of touch input, gesture input, voice command, eye tracking, gyroscopic input, pen input, mouse input, and keyboards input.

Application programming interface (API)—a set of routines, protocols, and tools for an application or service that enable the application or service to interact or communicate with one or more other applications and services managed by separate entities.

Confidence level—a percentage of confidence that candidate files are selected according to selection criteria that correspond to a user's interests.

Productivity service—a service to which a user subscribes to access one or more applications that when executed enable a user to communicate, view, create, edit, analyze, and share content.

Wireless communication—a communication medium to facilitate a communication session through a selected communication mode between two or more devices in the absence of a physical connection through an electrically or optically conductive medium.

Wired communication—a communication medium to facilitate a communication session through a selected communication mode between two or more devices with a physical connection through an electrically or optically conductive medium.

DETAILED DESCRIPTION

As briefly described, above, upon detecting a user action such as save, load, open, view, share, or comparable ones on a file, a file suggestion module or an application may determine other relevant files for the user performing the action. The relevancy may be determined through one or more queries based on a number of criteria, where the queries are executed on local or remote data stores, related to the user. For example, files on the local computing device of the user, files in an enterprise network associated with the user, files on a social network subscribed by the user may be evaluated for various relevancy criteria. Files determined to be relevant may be prioritized, ordered, and/or grouped for suggestion to the user and presented through a user interface of an application performing the detected action.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components for automatic file suggestion. Examples of platforms include, but are not limited to, a hosted service executed over a plurality of servers, an application executed on a highest prioritized computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Figure 1:
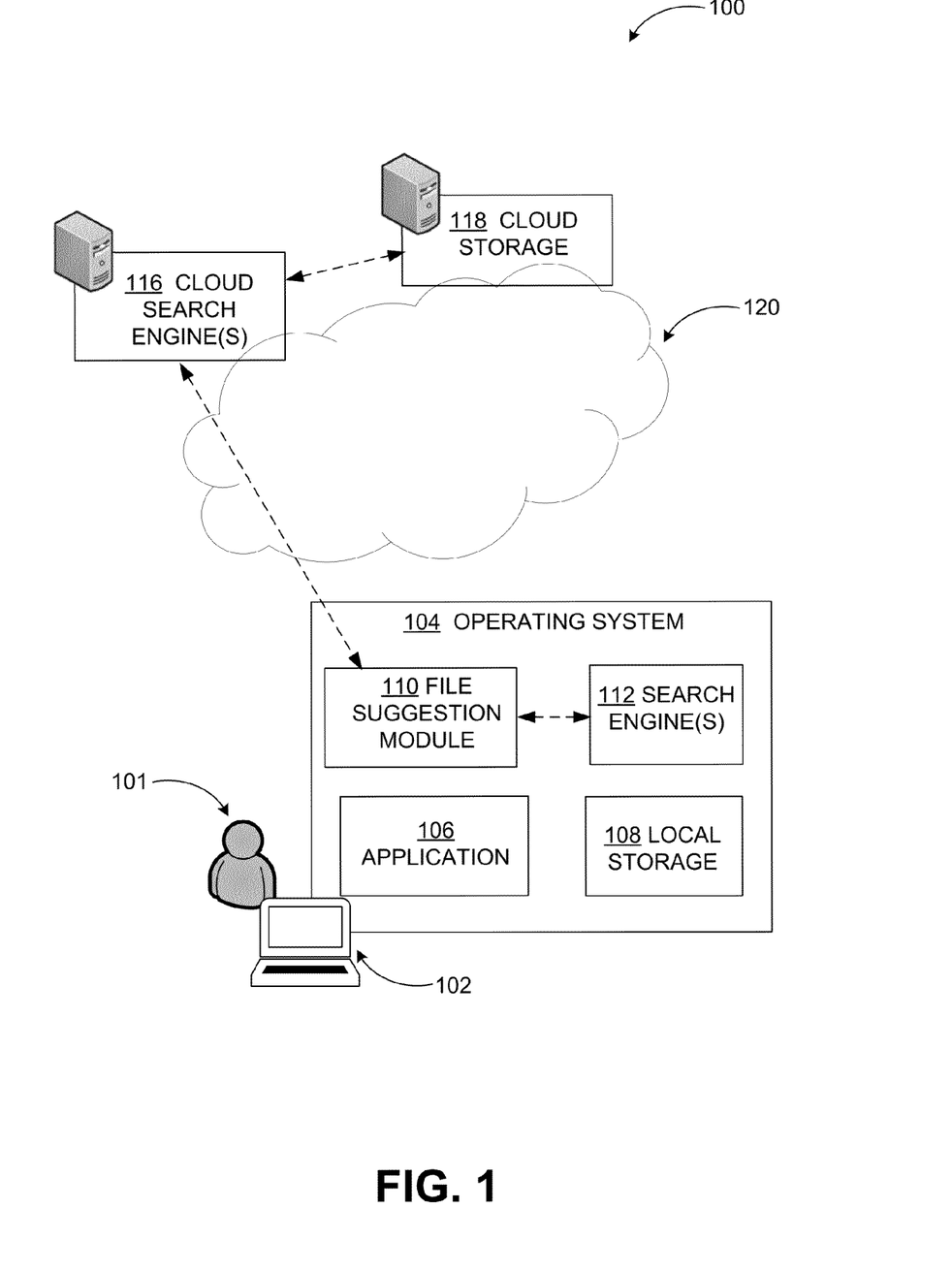
FIG. 1 includes a conceptual diagram illustrating an example file suggestion configuration, where a file suggestion module within an operating system may service applications within the same operating system.

FIG. 1 includes a conceptual diagram 100 illustrating an example file suggestion configuration, where a file suggestion module within an operating system may service applications within the same operating system.

In one example configuration, a computing device 102 such as a laptop computer may have an operating system 104. A number of applications such as application 106 may be executed within the infrastructure provided by the operating system 104. The applications may include any application such as word processing applications, spreadsheet applications, presentations applications, communication applications, imaging applications, audio/video processing applications, graphic processing applications, and comparable ones. Application 106 may process files as part of its operation such as open, save, load, modify. Application 106 may also enable the user 101 to view, edit, share, or perform other actions on the files. The files processed by the application 106 may be stored locally on the computing device 102, such as in local storage 108. Application 106 may also process files stored remotely such as cloud storage 118, which may be accessible over one or more networks (or clouds) such as network 120.

In some embodiments, a file suggestion module 110 operating within the operating system 104 may detect an action associated with a locally stored file or a remotely stored file being processed by the application 106 and coordinate with one or more local search engines 112 generation of one or more queries to determine files relevant to the user 101. The queries may be based on criteria such as whether a user initiating the action is an author of a file, whether the user has edited the file, whether the file is shared with the user, whether the user opened the file in the past, whether the file was presented at a meeting that the user attended, whether the file was emailed to the user, whether the user submitted a post to a social network or a professional network associated with the file, whether the user commented on the file, and/or whether the user joined a group or team site on which the file is listed. The criteria listed above are not an exhaustive list and are intended to provide illustrative examples.

In other embodiments, file suggestion module 110 may coordinate the generation and submission of the queries with remote search engines such as cloud search engines 116 over the network 120. The search engines may execute the queries on the local storage 108 and/or cloud storage 118. The files from the local storage 108 and/or cloud storage 118 may be prioritized, ordered, and/or grouped for presentation based on the criteria used for the queries, a chronological recency of the one or more criteria, and similar factors. The prioritized, ordered, and/or grouped files may then be presented to the user 101 through a user experience of the application 106 or a generic user experience managed by the file suggestion module 110. In one example, application 106 may allow the user 101 to view a library or a directory of files associated with himself or herself. The library or directory of files may include document folders on the computing device 102, on a different online file library website, or a remote file share library. The suggested files may be presented separately or along with the files (and folders) of the viewed library or directory.

In further embodiments, summary information associated with each file may be displayed along with a representation of each file. The summary information may include one or more of a name of the file, an owner of the file, a storage location of the file, one or more images associated with the file, a type of the file, and a modification date of the file. The summary information may also include a reason for selection of the file to be suggested to the user to give confidence to the user about the selection of the suggested file. The suggested files may be displayed, for example, in grid or list format. The suggested files may also be displayed along with regular files in a folder or directory of the user distinguished through one or more of a textual scheme, graphical scheme, color scheme, shading scheme, or similar scheme. The additional summary information may also distinguish the suggested files from the regular files.

The computing device 102 may include a desktop computer, a laptop computer, a tablet computer, a vehicle mount computer, a smart phone, or a wearable computing device. The user 101 may be enabled to interact with the user experience and select among the suggested files through one or more of touch input, gesture input, voice command, eye tracking, gyroscopic input, pen input, mouse input, and/or keyboard input.

Figure 2:
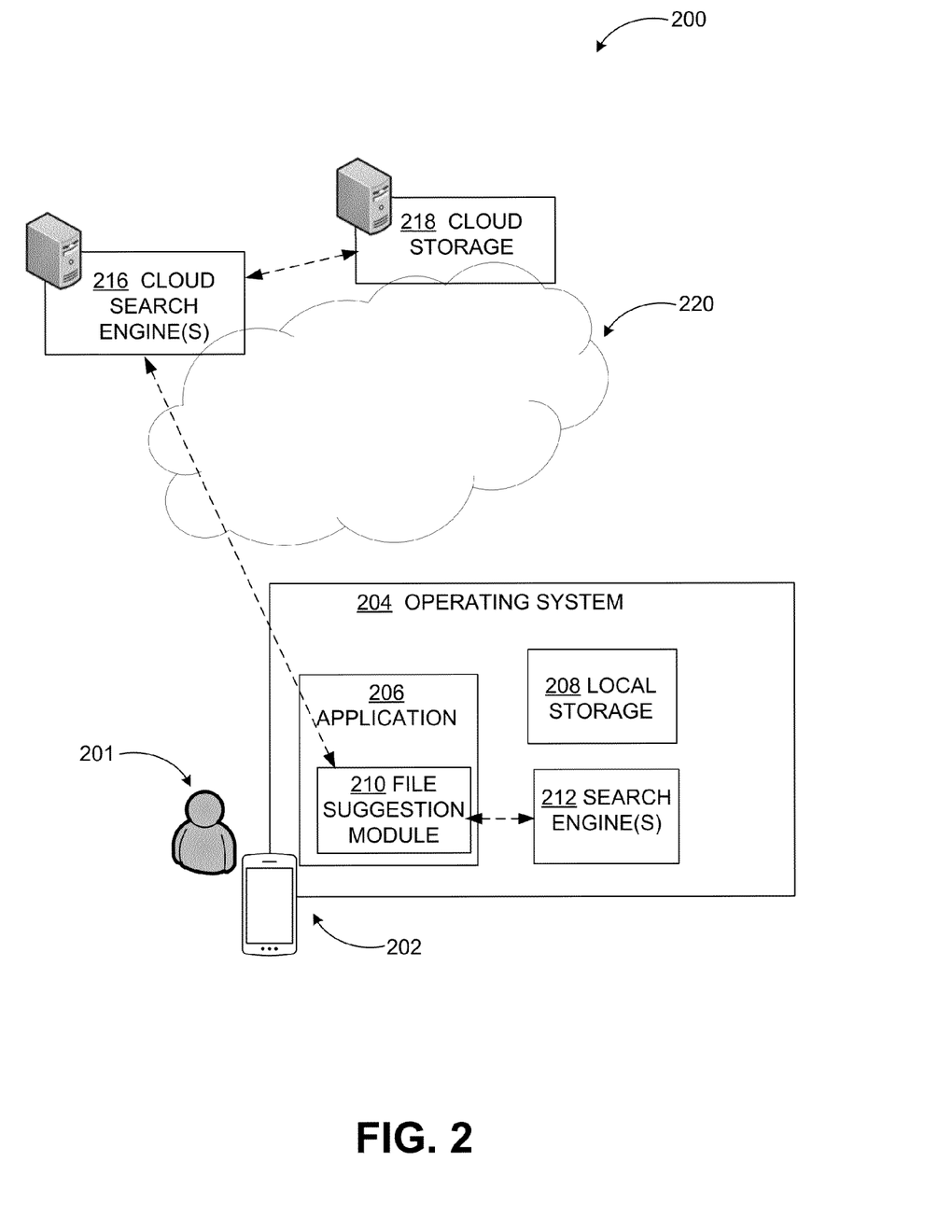
FIG. 2 includes a conceptual diagram illustrating another example file suggestion configuration, where a file suggestion module within an application may service the same application.

FIG. 2 includes a conceptual diagram 200 illustrating another example file suggestion configuration, where a file suggestion module within an application may service the same application.

The components in diagram 200 such as cloud search engines 216, cloud storage 218, network 220, operating system 204, application 206, file suggestion module 210, local storage 208, and local search engines 212 may be similarly structured and function similar to their counterparts in FIG. 1. The computing device 202 is illustrated as a smart phone in FIG. 2. Differently from FIG. 1, the file suggestion module 210 in diagram 200 may be an integrated part of the application 206 and thus work within the application 206 enabling presentation of suggested files to user 201.

Figure 3:
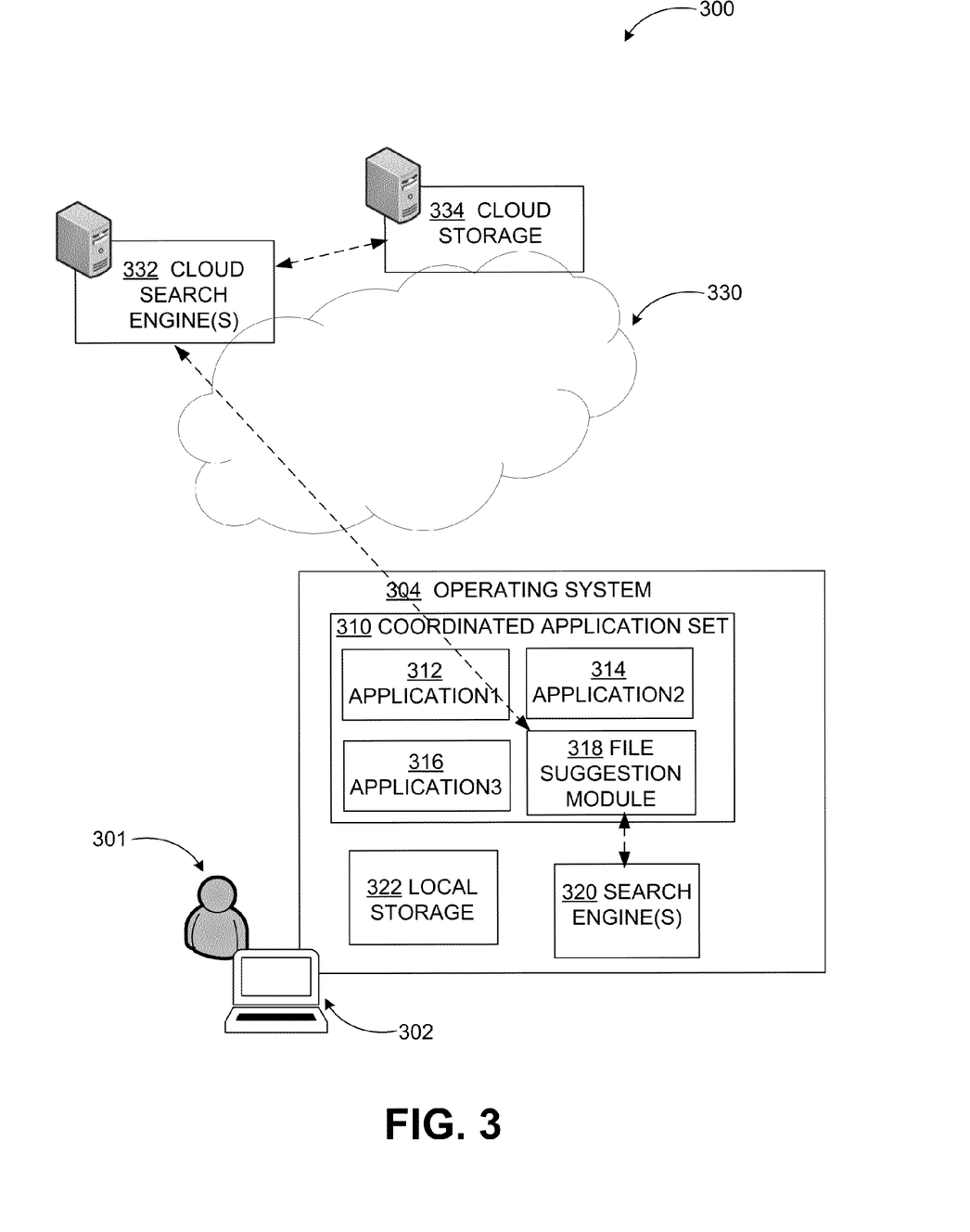
FIG. 3 includes a conceptual diagram illustrating a further example file suggestion configuration, where a file suggestion module within a coordinated application set may service applications within the same coordinated application set.

FIG. 3 includes a conceptual diagram 300 illustrating a further example file suggestion configuration, where a file suggestion module within a coordinated application set may service applications within the same coordinated application set.

The components in diagram 300 such as cloud search engines 332, cloud storage 334, network 330, operating system 304, file suggestion module 318, local storage 322, and local search engines 320 may be similarly structured and function similar to their counterparts in FIG. 1 or 2. The computing device 302 is illustrated as a laptop computer in FIG. 3. Differently from FIGS. 1 and 2, a coordinated application set 310 may provide functionalities of a variety of applications (applications 312, 314, 316) to the user 301 under one umbrella. The file suggestion module 318 in diagram 300 may be an integrated part of the coordinated application set 310 and provide file suggestion services to the applications within the coordinated application set 310. For example, the coordinated application set 310 may be a productivity suite and include applications such as word processing applications spreadsheet applications, presentation applications, communication applications, calendaring applications, and note taking applications.

Figure 4:
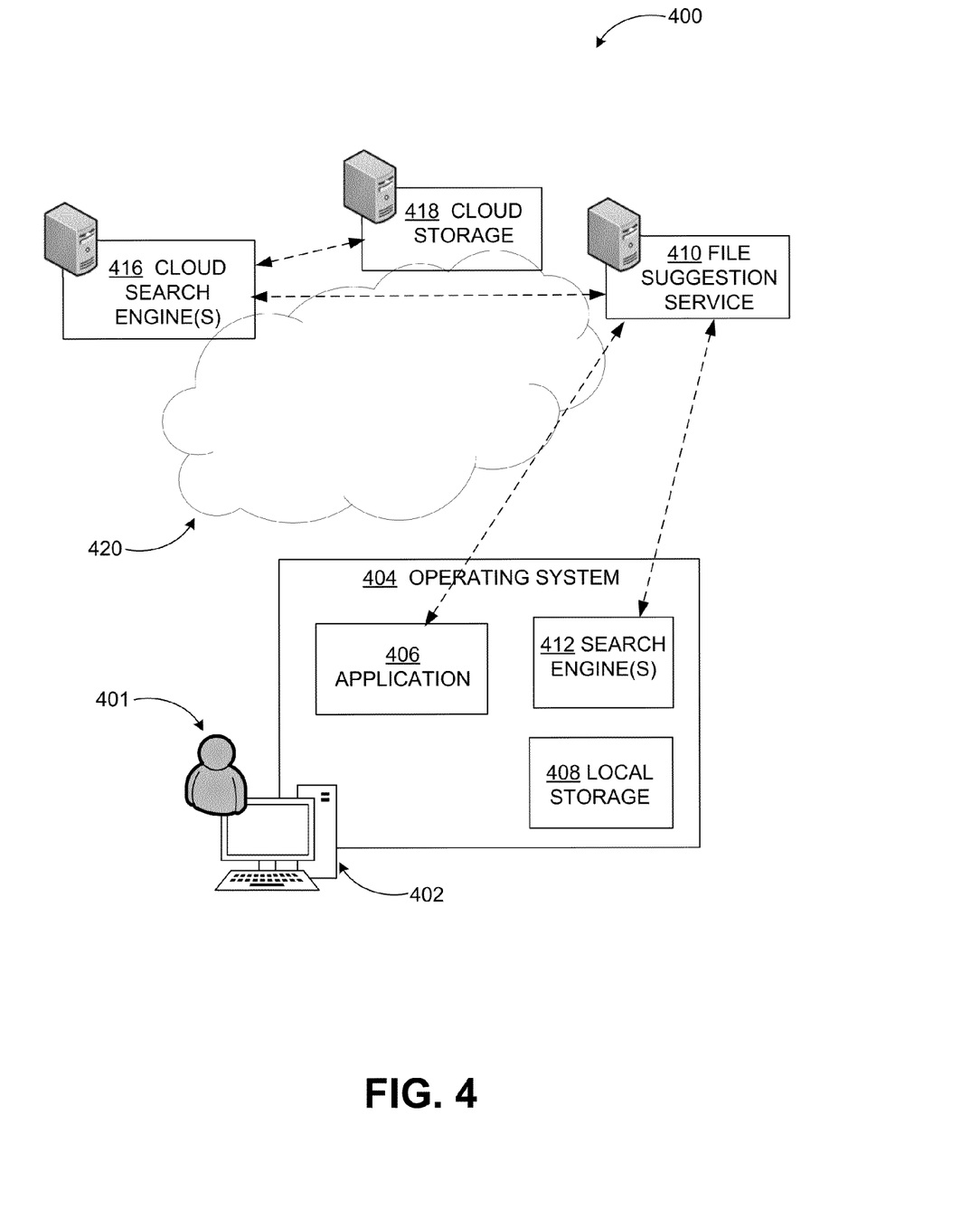
FIG. 4 includes a conceptual diagram illustrating a yet further example file suggestion configuration, where a cloud-based third party file suggestion service may service applications in remote computing devices.

FIG. 4 includes a conceptual diagram 400 illustrating a yet further example file suggestion configuration, where a cloud-based third party file suggestion service may service applications in remote computing devices.

The components in diagram 400 such as cloud search engines 416, cloud storage 418, network 420, operating system 404, application 406, local storage 408, and local search engines 412 may be similarly structured and function similar to their counterparts in FIGS. 1 and 2. The computing device 402 is illustrated as a client device connected to a server in FIG. 4. Differently from FIG. 1 or 2, the system in diagram 400 includes a file suggestion service 410, which may be accessed by multiple applications executed on multiple devices via network 420 and enable presentation of suggested files to user 401. For example, file suggestion service 410 may be a third party hosted service that can be accessed through standardized application programming interfaces (APIs) by any application that is compatible with it.

In some embodiments, a confidence level in the determination and/or prioritization of the relevant files may be determined based on the criteria used, how strongly a file meets the criteria (or how many criteria the file meets). The suggested files may then be selected among those that have a confidence level above a predefined threshold.

Figure 5:
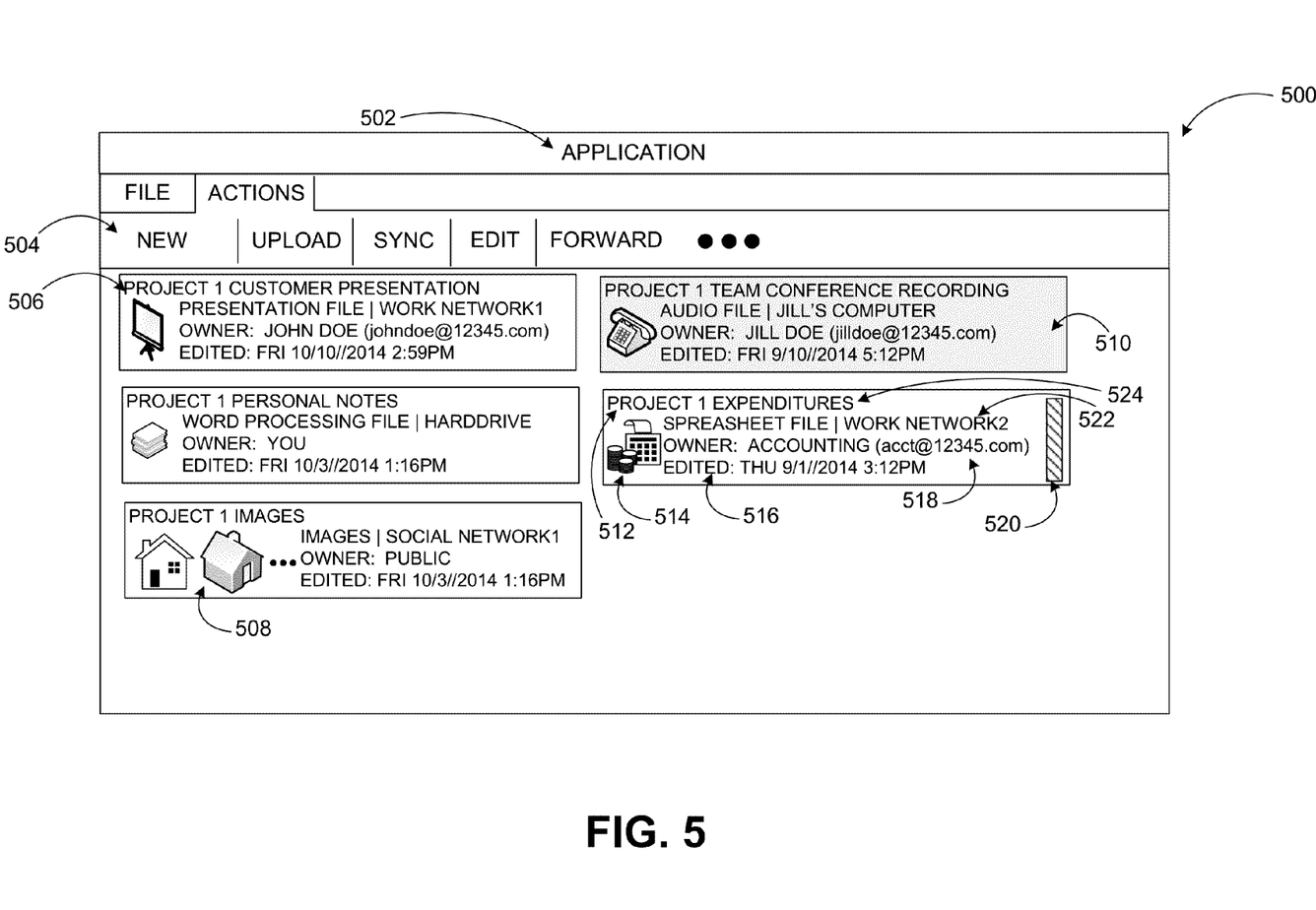
FIG. 5 illustrates an example user experience for suggesting files with summary information.

FIG. 5 illustrates an example user experience for suggesting files with summary information.

The example user experience 500 in FIG. 5 is associated with an application 502. As mentioned above, suggested files may also be presented through a generic user experience managed by the file suggestion module or the operating system for different applications. The user experience 500 may include one or more command menus 504 and present suggested files 506, 512, and 510 in a number of textual and/or graphical formats. In the example illustration, each file is represented by a file name 524, a type of file, a location of the file 522, an owner or author of the file 518, and an indication of when the file was last edited 516. The representation may also include an icon 514, a graphic, or one or more images 508 associated with the file. The graphic representation may be an icon of the file type or thumbnail images from the file (e.g., selected images from a video file).

In some embodiments, graphic, color, or shading schemes may be employed to indicate further information associated with the files, for example, a file type, a priority of the files, whether a file is currently being processed by someone else, whether the file has been recently used, or similar information. The indications may include shading (as in file 510) or a graphic 520, for example.

Figure 6:
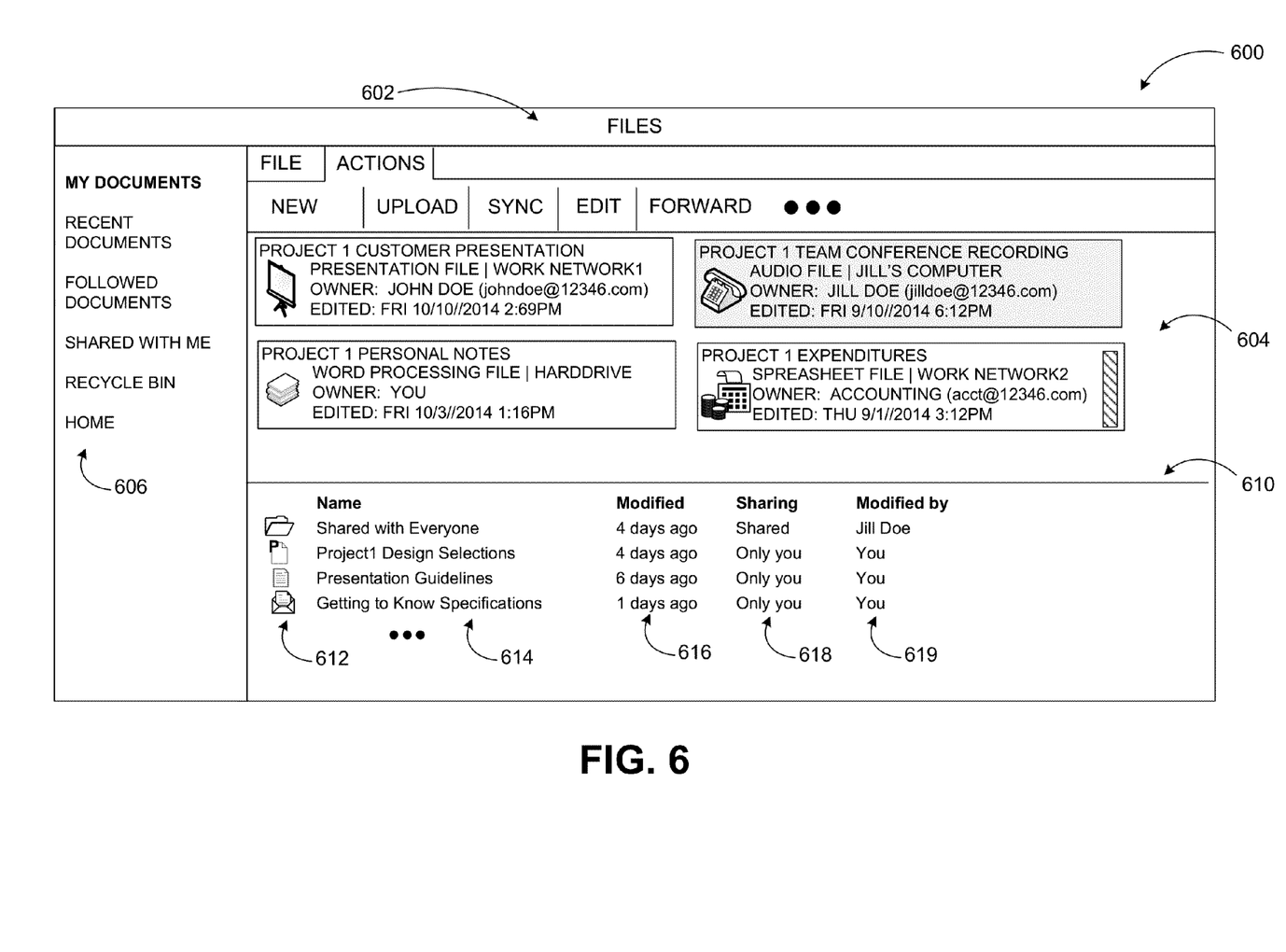
FIG. 6 illustrates another example user experience, where suggested files may be presented along with files of a user in the user's local or network directory.

FIG. 6 illustrates another example user experience, where suggested files may be presented along with files of a user in the user's local or network directory.

User experience 600 is an example of a generic file user interface 602 managed by the file suggestion module or the operating system (or a file management system within the operating system). In section 606 of the user experience available storage containers such as local file directories, networked file directories, shared files, etc. may be listed as links to provide those containers' contents. In section 604, suggested files may be presented as discussed above in conjunction with FIG. 5. In addition to the suggested files, the user interface 602 may present files in a selected container (e.g., "My Documents") in a traditional manner in section 610.

For example, the files in the selected container may be displayed in a list format with icons 612 representing each file type, file names 614, last modification dates 616, sharing information 618, and last modified by information 619. The user experiences in FIGS. 5 and 6 are for illustration purposes only and any user experience with any configuration may be used to present suggested files with various presentation schemes.

The examples in FIGS. 1 through 6 have been described using specific network environments, systems, services, applications, and processes to automatically suggest files. Embodiments to automatically suggest files are not limited to the specific network environments, systems, services, applications, and processes according to these examples.

Relevant file identification using automated queries to disparate data storage locations, as described in the embodiments above, may help reduce processor load by enabling faster selection of files as opposed to manual selection, which may involve multiple operations for each file to be selected. Network bandwidth usage may also be reduced through prevention of individual, manual file search operations. User efficiency may be improved by allowing users to see relevant files without having to remember or think about where to search. Through the summary information presented with the suggested files, users' interaction performance may be increased allowing users to select relevant files rapidly.

Figure 7:
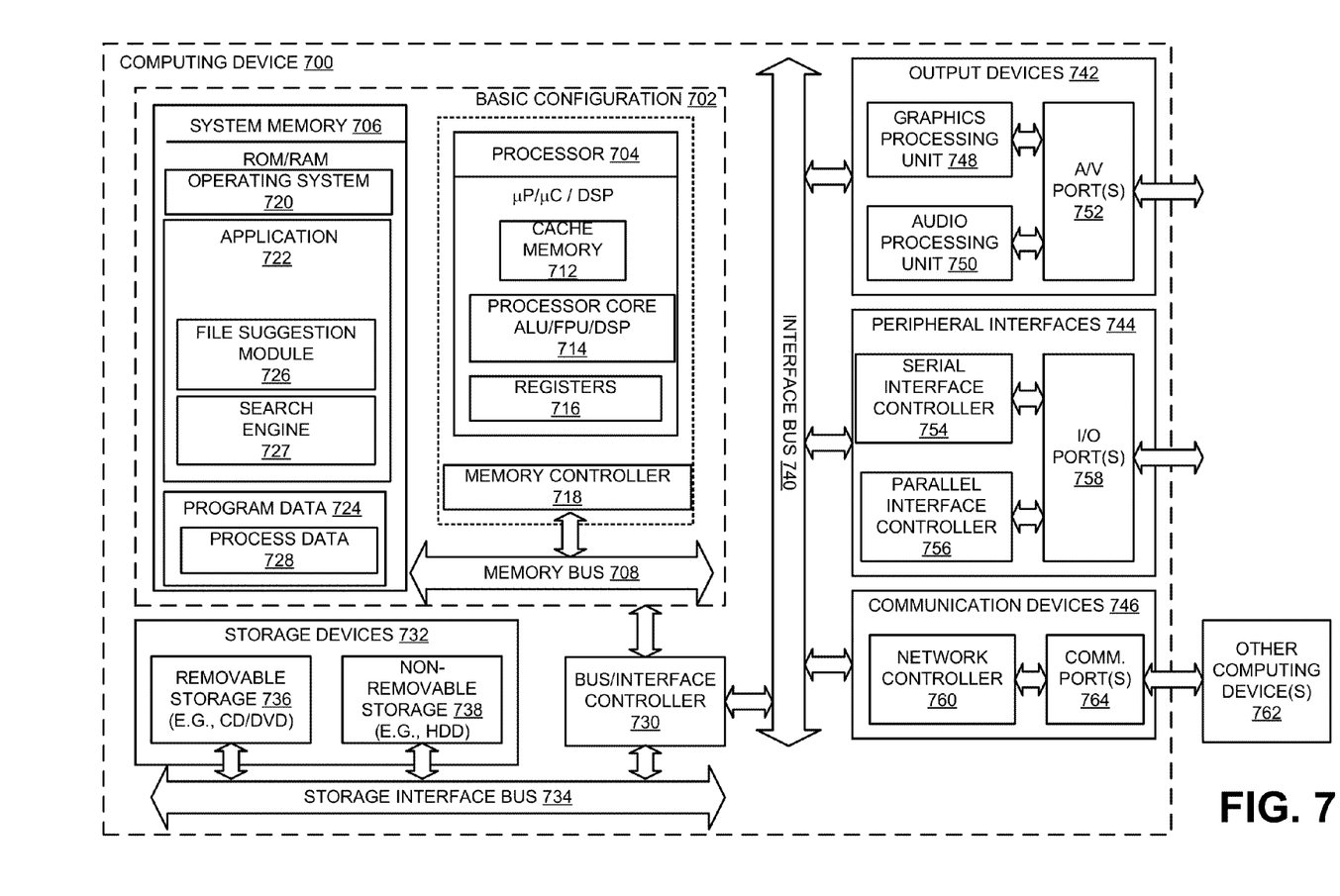
FIG. 7 is a block diagram of an example general purpose computing device, which may be used to implement automatic file suggestion.

FIG. 7 and the associated discussion are intended to provide a brief, general description of a general purpose computing device, which may be used to automatically suggest files.

For example, computing device 700 may be used as a server, desktop computer, portable computer, smart phone, special purpose computer, or similar device. In an example basic configuration 702, the computing device 700 may include one or more processors 704 and a system memory 706. A memory bus 708 may be used for communicating between the processor 704 and the system memory 706. The basic configuration 702 is illustrated in FIG. 7 by those components within the inner dashed line.

Depending on the desired configuration, the processor 704 may be of any type, including but not limited to a microprocessor (µP), a microcontroller (µC), a digital signal processor (DSP), or any combination thereof. The processor 704 may include one more levels of caching, such as a level cache memory 712, one or more processor cores 714, and registers 716. The example processor cores 714 may (each) include an arithmetic logic unit (ALU), a floating point unit (FPU), a digital signal processing core (DSP Core), or any combination thereof. An example memory controller 718 may also be used with the processor 704, or in some implementations the memory controller 718 may be an internal part of the processor 704.

Depending on the desired configuration, the system memory 706 may be of any type including but not limited to volatile memory (such as RAM), non-volatile memory (such as ROM, flash memory, etc.) or any combination thereof. The system memory 706 may include an operating system 720, an application 722, and program data 724. The application 722 may include a file suggestion module 726 and a search engine 727, which may be integrated modules of the application 722 or independent modules. The file suggestion module 726 and the search engine 727 may perform tasks associated with detection of user actions, generation of queries, and determination of relevant files for suggestion to the user as described herein. The program data 724 may include, among other data, process data 728 related to relevancy criteria and relevant files, as described herein.

The computing device 700 may have additional features or functionality, and additional interfaces to facilitate communications between the basic configuration 702 and any desired devices and interfaces. For example, a bus/interface controller 730 may be used to facilitate communications between the basic configuration 702 and one or more data storage devices 732 via a storage interface bus 734. The data storage devices 732 may be one or more removable storage devices 736, one or more non-removable storage devices 738, or a combination thereof. Examples of the removable storage and the non-removable storage devices include magnetic disk devices such as flexible disk drives and hard-disk drives (HDDs), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 706, the removable storage devices 736 and the non-removable storage devices 738 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 700. Any such computer storage media may be part of the computing device 700.

The computing device 700 may also include an interface bus 740 for facilitating communication from various interface devices (for example, one or more output devices 742, one or more peripheral interfaces 744, and one or more communication devices 746) to the basic configuration 702 via the bus/interface controller 730. Some of the example output devices 742 include a graphics processing unit 748 and an audio processing unit 750, which may be configured to communicate to various external devices such as a display or speakers via one or more A/V ports 752. One or more example peripheral interfaces 744 may include a serial interface controller 754 or a parallel interface controller 756, which may be configured to communicate with external devices such as input devices (for example, keyboard, mouse, pen, voice input device, touch input device, etc.) or other peripheral devices (for example, printer, scanner, etc.) via one or more I/O ports 758. An example communication device 746 includes a network controller 760, which may be arranged to facilitate communications with one or more other computing devices 762 over a network communication link via one or more communication ports 764. The one or more other computing devices 762 may include servers, client devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 700 may be implemented as a part of a general purpose or specialized server, mainframe, or similar computer that includes any of the above functions. The computing device 700 may also be implemented as a personal computer including both laptop computer and non-laptop computer configurations.

Example embodiments may also include methods to automatically suggest files. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need, not be collocated with each other, but each can be only with a machine that performs a portion of the program. In other embodiments, the human interaction can be automated such as by pre-selected criteria that, may be machine automated.

Figure 8:
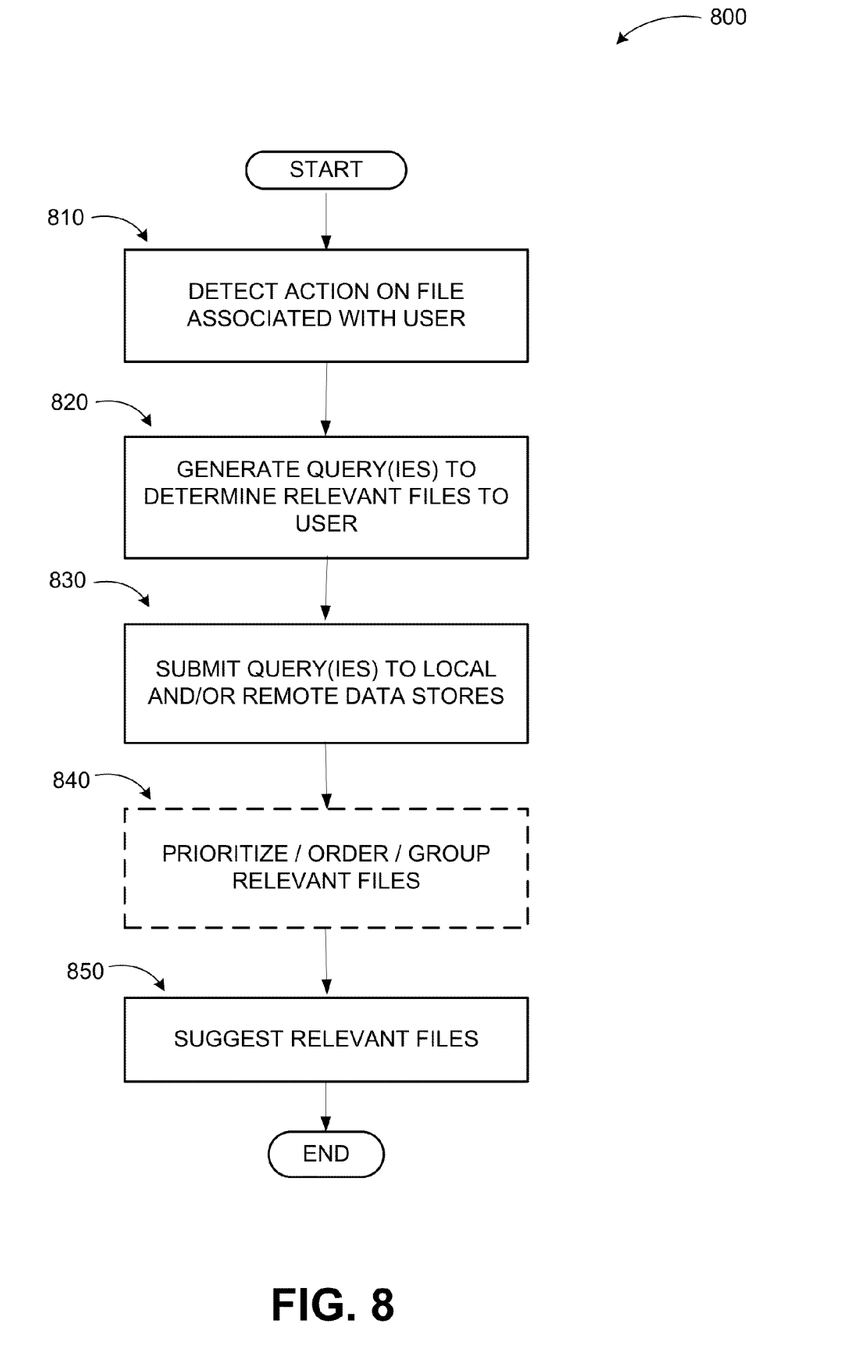
FIG. 8 illustrates a logic flow diagram of a method to automatically suggest files, according to embodiments.

FIG. 8 illustrates a logic flow diagram for process 800 of a method to automatically suggest files, according to embodiments. Process 800 may be implemented on a server or other computing devices.

Process 800 begins with operation 810, where an action associated with a file is detected. The action may include a save action, a view action, a comment action, an open action, a share action, or similar, actions. For example, the view action may include a user viewing a library or a directory of files associated with themselves and optionally indicating interest in a file by hovering over it or selecting it. Other example actions may involve a selected file more directly.

At operation 820, one or more queries may be generated to determine relevance of other files to the user who is performing the action. The queries may be based on criteria such as whether the user initiating the action is an author of a file, whether the user has edited the file, whether the file is shared with the user, whether the user opened the file in the past, whether the file was presented, at a meeting that the user attended, whether the file was mailed to the user, whether the user submitted a post to a social network or a professional network associated with the file, whether the user commented on the file, and/or whether the user joined a group or team site on which the file is listed.

At operation 830, the queries may be submitted to local or remote data stores to be executed on files at those data stores. The data stores may include the user's file directories, the user's cloud directories, networked data stores, public data stores, to name a few.

At optional operation 840, relevant files determined based on the results of the submitted queries may be prioritized, ordered for display, and/or grouped for display based on the query results and the used criteria. At operation 850, the prioritized, ordered, and/or grouped relevant files may be suggested through a user experience with or without the user's own files in a selected directory. In some embodiments, other operations may occur between querying, a search provider and displaying the results. For example, upon receiving the search results a query may be submitted for related information about the resultant files such as appropriate file type icons.

The operations included in process 800 are for illustration purposes Relevant file identification using automated queries to disparate data storage locations may be implemented by similar processes with fewer or additional steps, as well as in different order of operations using the principles described herein.

In some examples, a computing device to automatically suggest one or more files is described. The computing device may include a display device, a memory configured to store instructions, and a processor coupled to the display device and the memory. The processor may be configured to detect an action on one of a locally stored file or a remotely stored file associated with a user; generate one or more queries to determine files relevant to the user; submit the one or more queries to one or more local data stores at the computing device and remote data stores; and automatically suggest, through the display device, the one or more files determined to be relevant to the user based on results of the submitted one or more queries.

In other examples, the one or more queries may be generated based on one or more criteria including, but not limited to whether the user initiating the action is an author of a file, whether the user has edited the file, whether the file is shared with the user, whether the user opened the file in the past, whether the file was presented at a meeting that the user attended, whether the file was emailed to the user, whether the user submitted a post to one of a social network or a professional network associated with the file, whether the user commented on the file, and whether the user joined a group or team site on which the file is listed. The processor may also determine the one or more files to be relevant to the user based on a chronological recency of the one or, more criteria.

In further examples, the processor may be further configured to prioritize the one or more files determined to be relevant to the user based on the results of the one or more queries and a chronological recency of the one or more criteria, order and group the one or more files determined to be relevant to the user based on the results of the one or more queries and a chronological recency of the one or more criteria, and/or display the ordered and grouped one or more files determined to be relevant to the user along with summary information associated with each file. The summary information may include one or more of a name of the file, an owner of the file, a storage location of the file, one or more images associated with the file, a type of the file, and a modification date of the file. The summary information may also include a reason for selection of the file to be suggested to the user.

In yet other examples, the one or more queries may be generated and submitted by one or more search engines independent from a file suggestion module configured to automatically suggest the one or more files. At least one of the one or more search engines may be local and at least another of the one or more search engines may be a remote search engine. The processor may also be configured to determine a confidence level for each of a plurality of candidate files based on the results of the submitted one or more queries and select the one or more files to be suggested in response to a determination that the confidence level is above a predefined threshold. The action on one of the locally stored file or the remotely stored file may include one of an open action, a save action, a share action, a comment action, or a view action.

In other examples, a system to automatically suggest one or more files is described. The system may include a first computing device configured to provide access to an application, a second computing device configured to manage storage of a plurality of files, and a third computing device communicatively coupled to the first computing device and the second computing device. The third computing device may be configured to execute a file suggestion module, which may detect an action on one of a locally stored file or a remotely stored file associated with a user; generate one or more queries based on one or more criteria to determine files relevant to the user; submit the one or more queries to one or more local data stores at the computing device and remote data stores; and automatically suggest, through the display device, the one or more files determined to be relevant to the user based on results of the submitted one or more queries and present summary information for each of the one or more files, the summary information comprising one or more of: a name of the file, an owner of the file, a storage location of the file, one or more images associated with the file, a type of the file, and a modification date of the file.

In further examples, the file suggestion module may be an integrated part of the application, an integrated part of a coordinated set of applications including the application, a part of an operating system of the third computing device providing file suggestion services to applications within the operating system, or a part of a third party service accessible by a plurality of computing devices over one or more networks. The one or more queries may be generated by one or more of a search engine at the third computing device, a search engine at the second computing device, and a search engine at a fourth computing device accessible over one or more networks.

In yet other examples, a method to automatically suggest one or more files is described. The method may include detecting one of an open action, a save action, a share action, a comment action, or a view action on one of a locally stored file or a remotely stored file associated with a user; generating one or more queries based on one or more criteria to determine files relevant to the user; submitting the one or more queries to one or more local data stores at the computing device and remote data stores; determining the one or more files to be relevant to the user based on results of the submitted one or more queries; one or more of: prioritizing, ordering, and grouping the one or more files based on the results of the one or more queries and a chronological recency of the one or more criteria; and automatically suggesting the one or more files.

In yet further examples, automatically suggesting the one or more files may include automatically suggesting, through a display device, the one or more files determined to be relevant to the user along with a plurality of files in a selected file directory associated with the user. The method may also include displaying the suggested one or more files in one of a list or a grid form on one of a user experience of an application processing the file or on a separate user experience.

In some examples, a means to automatically suggest one or more files is described. The means to automatically suggest one or more files may include a means for detecting one of an open action, a save action, a share action, a comment action, or a view action on one of a locally stored file or a remotely stored file associated with a user; a means for generating one or more queries based on one or more criteria to determine files relevant to the user; a means for submitting the one or more queries to one or more local data stores at the computing device and remote data stores; a means for determining the one or more files to be relevant to the user based on results of the submitted one or more queries; a means for one or more of: prioritizing, ordering, and grouping the one or more files based on the results of the one or more queries and a chronological recency of the one or more criteria; and a means for automatically suggesting the one or more files.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A computing device to automatically suggest one or more files,
   the computing device comprising:
   a display device;
   a memory configured to store instructions; and
   a processor coupled to the display device and the memory, wherein the processor is configured to:
   detect an action on one of a locally stored file or a remotely stored file associated with a user;
   generate one or more queries for determining files based on one or more criteria, the one or more criteria including at least one of: whether a file is shared with the user, whether a file has been opened by the user in the past, and whether a file was presented at a meeting that the user attended;
   submit the one or more queries to one or more local data stores at the computing device and remote data stores;
   select one or more files determined to be relevant to the user based on results of the submitted one or more queries; and
   display, through the display device, the one or more selected files along with summary information associated with each of the one or more selected files, wherein the summary information includes a reason for selection of the file, and wherein the reason includes information about the one or more criteria.

2. The computing device of claim 1, wherein, the one or more criteria further include:
   whether the user initiating the action is an author of a file,
   whether the user has edited the file,
   whether the file was emailed to the user,
   whether the user submitted a post to one of a social network or a professional network associated with the file,
   whether the user commented on the file, and
   whether the user joined a group or team site on which the file is listed.

3. The computing device of claim 2, wherein the processor is further configured to:
   determine the one or more files to be relevant to the user based on a chronological recency of the one or more criteria.

4. The computing device of claim 2, wherein the processor is further configured to:
   prioritize the one or more files determined to be relevant to the user based on the results of the one or more queries and a chronological recency of the one or more criteria.

5. The computing device of claim 2, wherein the processor is further configured to:
   order and group the one or more files determined to be relevant to the user based on the results of the one or more queries and a chronological recency of the one or more criteria; and display the ordered and grouped one or more files determined to be relevant to the user along with the summary information associated with each file.

6. The computing device of claim 5, wherein the summary information further comprises one or more of: a name of the file, an owner of the file, a storage location of the file, one or more images associated with the file, a type of the file, and a modification date of the file.

7. The computing device of claim 1, wherein the one or more queries are generated and submitted by one or more search engines independent from a file suggestion module configured to automatically suggest the one or more files.

8. The computing device of claim 7, wherein at least one of the one or more search engines is local and at least another of the one or more search engines is a remote search engine.

9. The computing device of claim 1, wherein the processor is further configured to:
 determine a confidence level for each of a plurality of candidate files based on the results of the submitted one or more queries; and
 select the one or more files to be suggested in response to a determination that the confidence level is above a predefined threshold.

10. The computing device of claim 1, wherein the action on one of the locally stored file or the remotely stored file includes one of an open action, a save action, a share action, a comment action, or a view action.

11. A system to automatically suggest one or more files, the system comprising:
 a first computing device configured to provide access to an application;
 a second computing device configured to manage storage of a plurality of files; and
 a third computing device communicatively coupled to the first computing device and the second computing device; wherein the third computing device is configured to execute a file suggestion module configured to:
  detect an action on one of a locally stored file or a remotely stored file associated with a user;
  generate one or more queries based on one or more criteria for determining files based on one or more criteria, the one or more criteria including at least one of: whether a file is shared with the user, whether a file has been opened by the user in the past, and whether a file was presented at a meeting that the user attended;
  submit the one or more queries to one or more local data stores at the computing device and remote data stores;
  select one or more files determined to be relevant to the user based on results of the submitted one or more queries; and
  present the one or more selected files along with summary information associated with each of the one or more selected files, wherein the summary information includes a reason for selection of the file, and wherein the reason includes information about the one or more criteria.

12. The system of claim 11, wherein the file suggestion module is an integrated part of the application.

13. The system of claim 11, wherein the file suggestion module is an integrated part of a coordinated set of applications including the application.

14. The system of claim 11, wherein the file suggestion module is part of an operating system of the third computing device providing file suggestion services to applications within the operating system.

15. The system of claim 11, wherein the file suggestion module is part of a third party service accessible by a plurality of computing devices over one or more networks.

16. The system of claim 11, wherein the one or more queries are generated by one or more of a search engine at the third computing device, a search engine at the second computing device, and a search engine at a fourth computing device accessible over one or more networks.

17. A method to automatically suggest one or more files, the method comprising:
 detecting one of an open action, a save action, a share action, a comment action, or a view action on one of a locally stored file or a remotely stored file associated with a user;
 generating one or more queries based on one or more criteria for determining files based on one or more criteria, the one or more criteria including at least one of: whether a file is shared with the user, whether a file has been opened by the user in the past, and whether a file was presented at a meeting that the user attended;
 submitting the one or more queries to one or more local data stores at the computing device and remote data stores;
 the selecting one or more files to be relevant to the user based on results of the submitted one or more queries;
 one or more of: prioritizing, ordering, and grouping the one or more files based on the results of the one or more queries and a chronological recency of the one or more criteria; and
 displaying, through a display device, the one or more selected files along with summary information associated with each of the one or more selected files, wherein the summary information includes a reason for selection of the file, and wherein the reason includes information about the one or more criteria.

18. The method of claim 17, wherein displaying the one or more files comprises:
 automatically suggesting, through the display device, the one or more files determined to be relevant to the user along with a plurality of files in a selected file directory associated with the user.

19. The method of claim 17, further comprising:
 displaying the suggested one or more files in one of a list or a grid form on one of a user experience of an application processing the file or on a separate user experience.

* * * * *